United States Patent
Odate et al.

(10) Patent No.: US 7,953,532 B2
(45) Date of Patent: May 31, 2011

(54) SEATBELT DEVICE FOR VEHICLE

(75) Inventors: Shotaro Odate, Utsunomiya (JP);
Osamu Tsurumiya, Shimotsuke (JP);
Yo Ito, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 539 days.

(21) Appl. No.: 12/171,716

(22) Filed: Jul. 11, 2008

(65) Prior Publication Data
US 2009/0024283 A1    Jan. 22, 2009

(30) Foreign Application Priority Data

Jul. 17, 2007    (JP) ................................ 2007-185514

(51) Int. Cl.
*B60R 22/48* (2006.01)
*B60R 22/46* (2006.01)

(52) U.S. Cl. .......... 701/45; 180/268; 280/806; 242/374; 242/390.8

(58) Field of Classification Search .................... 701/45; 280/806; 242/374, 390.8, 390.9; 180/268
See application file for complete search history.

(56) References Cited

U.S. PATENT DOCUMENTS

| | | | | |
|---|---|---|---|---|
| 5,788,281 A * | 8/1998 | Yanagi et al. | ................. | 280/806 |
| 6,213,512 B1 * | 4/2001 | Swann et al. | ................. | 280/806 |
| 6,616,186 B1 | 9/2003 | Midorikawa et al. | | |
| 6,908,112 B2 * | 6/2005 | Yano et al. | ..................... | 280/805 |
| 7,180,258 B2 * | 2/2007 | Specht et al. | ................. | 318/432 |
| 7,533,903 B2 * | 5/2009 | Takao et al. | ................... | 280/807 |
| 7,641,237 B2 * | 1/2010 | Odate | .......................... | 280/807 |
| 2001/0054816 A1 | 12/2001 | Brambilla et al. | ............ | 280/806 |
| 2007/0282505 A1 * | 12/2007 | Bolton et al. | .................. | 701/45 |
| 2007/0284174 A1 * | 12/2007 | Odate et al. | .................... | 180/268 |

FOREIGN PATENT DOCUMENTS

EP    1698528    9/2006
JP    11-321552    11/1999

* cited by examiner

*Primary Examiner* — Ruth Ilan
(74) *Attorney, Agent, or Firm* — Rankin, Hill & Clark LLP

(57) ABSTRACT

A seatbelt device for a vehicle including: a belt reel having webbing wound thereon; a position detection device that detects a winding position of the belt reel; a motor that drives the belt reel to rotate to thereby perform winding of the webbing; and a control section that performs control of electric current conduction to the motor, wherein: the control section performs electric current conduction to the motor at a predetermined amount at the time of a rear vehicular collision or when a rear vehicular collision is predicted; and the electric current conduction amount is controlled, so that during electric current conduction at the predetermined electric current conduction amount, when a winding position detected by the position detection device reaches a predetermined position, variation in the winding position is suppressed.

8 Claims, 8 Drawing Sheets

SEATBELT DEVICE FOR VEHICLE

BACKGROUND OF THE INVENTION

Priority is claimed on Japanese Patent Application No. 2007-185514, filed Jul. 17, 2007, the content of which is incorporated herein by reference.

1. Field of the Invention

The present invention relates to a seatbelt device in a vehicle having a pretensioner, in particular, to a pretensioner control at the time of a rear vehicular collision, or at the time of predicting a rear vehicular collision.

2. Description of the Related Art

Conventionally there has been known a seatbelt device in which the upper body of a passenger is restrained on a seat back before a rear vehicular collision occurs, by operating a pretensioner to wind up webbing when a rear vehicular collision is predicted, and at the time of the rear vehicular collision, forward movement of the upper body of the passenger from the seat back is enabled to a certain extent by correction for reducing the operation intensity of the pretensioner in accordance with the collision acceleration and so forth. The above seatbelt device prevents the head of the passenger from swinging forward due to rebound action after the rear vehicular collision (for example, refer to Japanese Patent No. 3796961).

However, there is a problem in the above conventional technique in that a relatively complex control is required in which when predicting a rear vehicular collision, the possibility of the rear vehicular collision is determined based on the approaching velocity of an object coming from behind, and when the rear vehicular collision occurs, a reduction correction value is calculated based on the collision acceleration and so forth.

Consequently, an object of the present invention is to provide a seatbelt device for a vehicle in which the amount of webbing winding is appropriately and simply controlled at the time of a rear vehicular collision or when a rear vehicular collision is predicted, and it is possible to suppress an excessive restraint of the webbing.

SUMMARY OF THE INVENTION

In order to solve the above problems, the present invention employs the following. Namely, a seatbelt device for a vehicle includes: a belt reel having webbing wound thereon; a position detection device that detects a winding position of the belt reel; a motor that drives the belt reel to rotate to thereby perform winding of the webbing; and a control section that performs control of electric current conduction to the motor, wherein: the control section performs electric current conduction to the motor at a predetermined amount at the time of a rear vehicular collision or when a rear vehicular collision is predicted; and the electric current conduction amount is controlled, so that during electric current conduction at the predetermined electric current conduction amount, when a winding position detected by the position detection device reaches a predetermined position, variation in the winding position is suppressed.

It may be arranged such that the predetermined electric current conduction amount is substantially constant.

According to the above-described seatbelt device present invention, at the time of a rear vehicular collision or when a rear vehicular collision is predicted the amount of electric current conduction to the motor in the case where the winding position of the belt reel (the winding amount of the webbing) reaches a predetermined position (for example, a position at which the passenger is not fully restrained) is limited based on detection information from the position detection device. That is to say, by only suppressing variation in the winding position, the webbing is appropriately wound up to thereby appropriately restrain the upper body of the passenger on the seat back when a rear vehicular collision is predicted, while allowing the upper body of the passenger to move forward from the seat back to a certain extent in the event of an actual rear vehicular collision. As a result, it is possible to suppress forward swinging of the head of the passenger due to the rebound action after the rear vehicular collision.

That is to say, by performing a simple control in which the belt reel is driven to rotate to a predetermined position at the time of a rear vehicular collision or when a rear vehicular collision is predicted, excessive restraint of the webbing can be suppressed.

It may be arranged such that the predetermined electric current conduction amount is controlled so as to become a maximum value immediately after commencing electric current conduction, and subsequently be gradually reduced.

In this case, the setting is such that the amount of electric current rises to maximum immediately after commencing electric current conduction, and subsequently the amount of electric current is gradually reduced. Consequently, the webbing is quickly wound up immediately after the rear vehicular collision and an appropriate tension force is given to the shoulder belt and lap belt, and the hip of the passenger is appropriately restrained as a result. Moreover, due to the subsequent gradual reduction in the electric current conduction amount, mainly the tension force of the shoulder belt is loosened, and as a result the upper body of the passenger can move forward.

It may be arranged such that the seatbelt device of a vehicle further includes an actuator that drives the belt reel to rotate with a thrust force of an explosive, wherein the control section disables the actuator when the winding position reaches a predetermined value.

In this case, when the winding position of the belt reel reaches a predetermined value, the actuator that drives the belt reel to rotate with a thrust force of an explosive is disabled. Therefore, it is possible to prevent the belt reel maintained at the predetermined winding position from being further rotation beyond the predetermined winding position by the actuator operated with the thrust force of an explosive.

Moreover, the present invention employs a control method of a seatbelt device for a vehicle having: a belt reel having webbing wound thereon; a position detection device that detects a winding position of the belt reel; and a motor that drives the belt reel to rotate to thereby perform winding of the webbing, the control method including: a step of performing electric current conduction to the motor at a predetermined electric current conduction amount during a predetermined period of time from a moment at which a rear vehicular collision occurs or a rear vehicular collision is predicted; a step of determining, during the predetermined period of time, whether or not the belt reel has reached a predetermined winding position, based on detection results from the position detection device; a step of monitoring positional variation in the belt reel after the belt reel has reached a predetermined winding position; and a step of changing the amount of electric current conduction to the motor based on the positional variation.

According to the above control method of the seatbelt device, by performing a simple control in which the belt reel is driven to rotate to a predetermined position at the time of a rear vehicular collision or when a rear vehicular collision is predicted, excessive restraint of the webbing can be suppressed.

It may be arranged such that the step of performing electric current conduction at a predetermined electric current conduction amount during the predetermined period of time includes: a step of rapidly increasing the electric current conduction amount; and a step of gradually reducing the electric current conduction amount.

In this case, the hip of the passenger can be restrained, and by loosening mainly the tension force of the shoulder belt, it is possible for the upper body of the passenger to move forward.

BRIEF DESCRIPTION OF THE DRAWINGS

FIG. 8A and FIG. 8B are sub flows showing controls of electric current conduction to the motor in the above second control sequence, wherein FIG. 8A shows a case where the webbing winding amount is substantially constant, and FIG. 8B shows a case where a predetermined variation is given to the webbing winding amount.

DETAILED DESCRIPTION OF THE INVENTION

Hereinafter, an embodiment of the present invention is described, with reference to the drawings.

Figure 1:
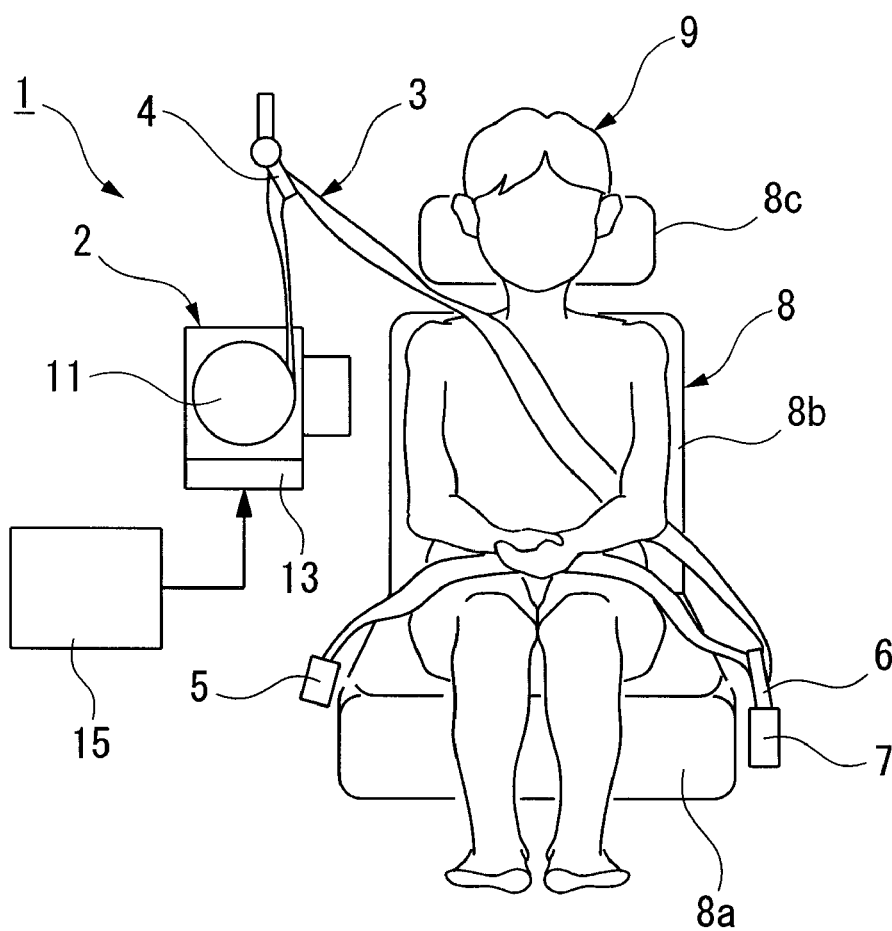
FIG. 1 is an explanatory drawing showing a front view of a seatbelt device according to an embodiment of the present invention.
Figure 2:
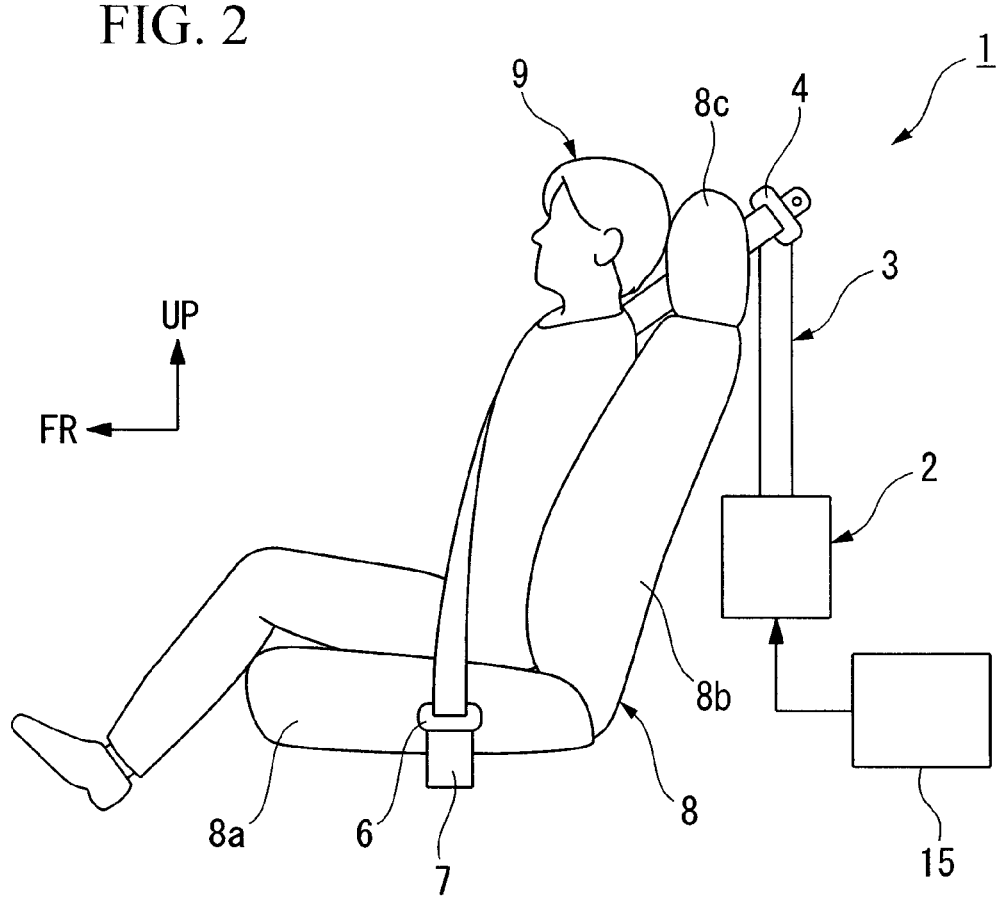
FIG. 2 is an explanatory drawing showing a side view of the above seatbelt device.

A seatbelt device 1 shown in FIG. 1 and FIG. 2 is a so called three point seatbelt type device. A belt shaped webbing 3 is pulled out upward from a retractor 2 attached to a center pillar (not shown in the drawing), and it is inserted through a through anchor 4 supported on the upper section of the center pillar. Moreover, the tip end section of a webbing 3 is fixed on a vehicle body floor via an outer anchor 5 on the outer side of a seat 8 in a passenger compartment. Furthermore, the webbing 3 is inserted through a tongue plate 6 disposed in between the through anchor 4 and the outer anchor 5. The tongue plate 6 can be attached to or removed from a buckle 7 fixed on the vehicle body floor on the inner side of the seat 8 in the passenger compartment. In FIG. 1 or FIG. 2, the arrow FR indicates the front side of the vehicle, the arrow LH indicates the left side of the vehicle, and the arrow UP indicates the upper side of the vehicle.

The seat 8, on which a passenger 9 is to sit, has a seat cushion 8a supported on the vehicle body floor, a seat back 8b that rises from the rear end section of the seat cushion 8a, and a head rest 8c supported on the top end section of the seat back 8b.

Figure 3:
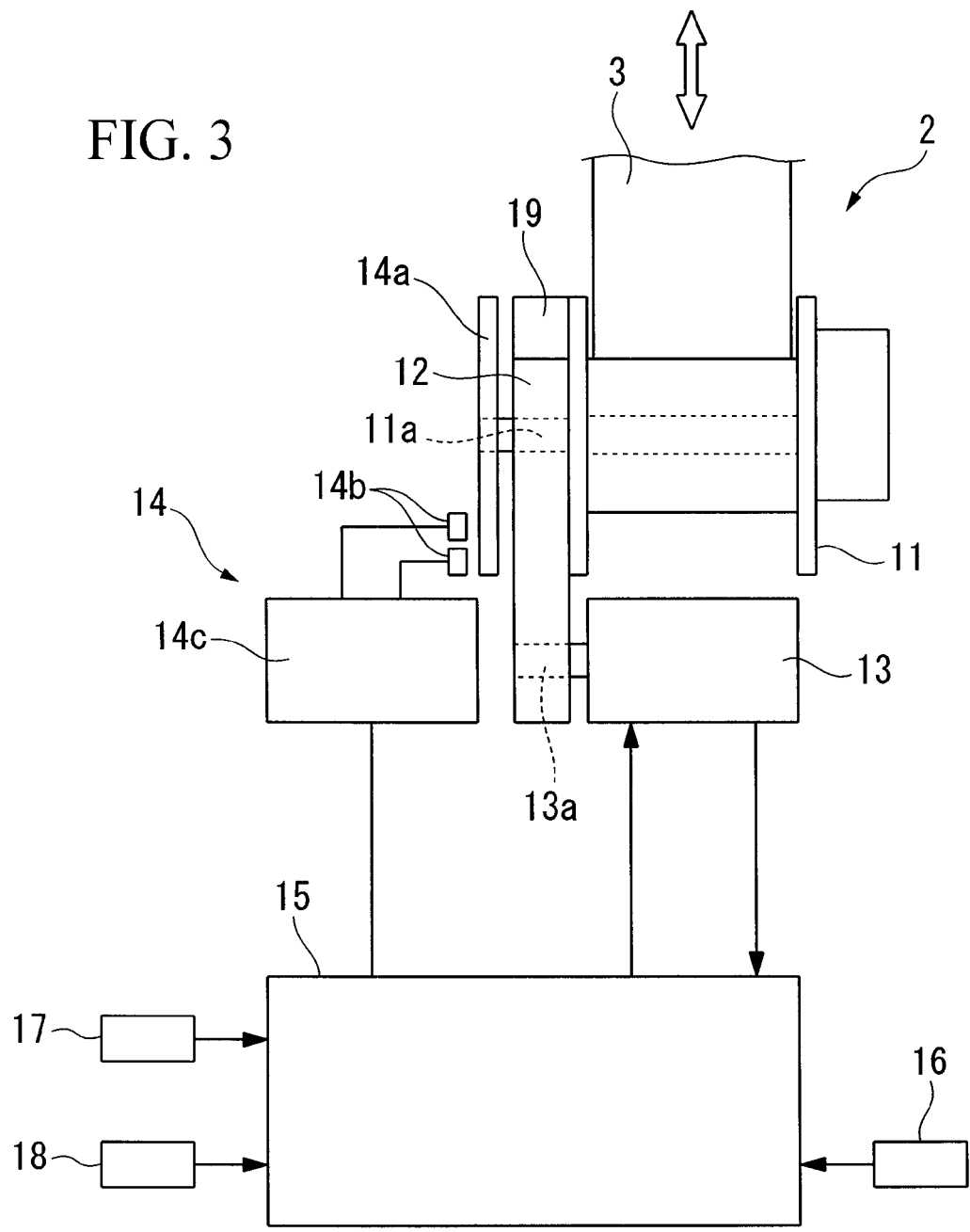
FIG. 3 is a schematic drawing of a principal portion of the above seatbelt device.

As shown in FIG. 3, in the retractor 2, a belt reel 11 rotatably supported on a casing (not shown in the drawing) winds the webbing 3, and a rotation shaft 11a of the belt reel 11 projects towards one side of the casing. To the rotation shaft 11a there is connected, via a power transmission mechanism 12 including a clutch (not shown in the drawing), a rotation shaft 13a of a motor 13.

The webbing 3 is pre-wound on the retractor 2 in the initial state. The passenger 9 sitting on the seat 8 pulls out this pre-wound webbing 3 and then fixes the tongue plate 6 to the buckle 7, thereby restraining mainly the chest and hip of the passenger 9 in the seat 8. At this time, the portion of the webbing 3 between the through anchor 4 and the tongue plate 6 serves as a shoulder belt 3a that retains the chest of the passenger 9. Moreover, the portion of the webbing 3 between the tongue plate 6 and the outer anchor 5 serves as a lap belt 3b that retains the hip of the passenger 9.

In the retractor 2, there is housed a winding spring (not shown in the drawing) that biases the belt reel 11 towards the winding direction. In a state where power transmission between the belt reel 11 and the motor 13 is cut by the clutch, a tension force caused by the biasing force of the winding spring acts on the webbing 3.

Here, in the seatbelt device 1, winding of the webbing 3 in the event of a vehicle collision is performed mainly with use of the driving force of the electric motor 13. Moreover, the motor 13 also serves as a pretensioner that, together with the winding spring, gives a predetermined tension force to the webbing 3.

On the rotation shaft 11a of the belt reel 11, there is provided a rotation sensor 14 that detects rotation of the belt reel 11. The rotation sensor 14, for example, has: a magnetic disk 14a having different magnetic polarities alternately magnetized around the circumferential direction thereof; a pair of Hall elements 14b disposed in close proximity to the outer circumference of the magnetic disk 14a; and a sensor circuit 14c that processes detection signals from the Hall elements 14b. Pulse signals that have been processed in the sensor circuit 14c are output to a controller 15 that mainly controls the drive of the motor 13.

The pulse signals that are input from the sensor circuit 14c to the controller 15 in accordance with the rotation of the belt reel 11 are used basically as feedback signals for driving the motor 13 in the controller 15. That is to say, in the controller 15, by counting the pulse signals, the rotation amount of the belt reel 11 (the amount of webbing 3 being pulled out or wound) is detected. Moreover, the rotation velocity of the belt reel 11 (velocity of pulling out or winding the webbing 3) is found by calculating the change rate (frequency) of the pulse signal. Furthermore, the rotation direction of the belt reel 11 is detected by comparing initial rises of the waveforms of both of the pulse signals.

To the controller 15, in addition to the rotation sensor 14, there are connected a buckle switch 16 that detects the connection state of the buckle 7 (attachment state of the webbing 3), an object detection device 17 such as radar that detects objects in front and rear of the vehicle, and a vehicle state detection device 18 such as acceleration sensor that detects vehicle acceleration in the front-rear/left-right directions.

Moreover, as shown in FIG. 3, the seatbelt device 1 is provided with an actuator 19 that drives the belt reel 11 to rotate in the winding direction with a thrust force of an explosive ignition. At the time of a front vehicular collision, in the seatbelt device 1, air bags (not shown in the drawing) are operated, and the motor 13 and the actuator 19 drive the belt reel 11 to rotate, to thereby quickly and completely wind up the webbing 3 so as to restrain the upper body of the passenger 9 on the seat back 8*b*.

On the other hand, at the time of a rear vehicular collision, only the motor 13 drives the belt reel 11 to rotate. At this time, the controller 15 controls the amount of electric current conduction to the motor 13, and the belt reel 11 is thereby retained in the predetermined winding position. The actuator 19 that drives the belt reel 11 to rotate with an explosive ignition is controlled so as to not operate in the case where a rear vehicular collision is determined based on detection results from the object detection device 17 and the vehicle state detection device 18.

Here, the predetermined winding position of the belt reel 11 refers to a position in which the webbing 3 is wound up to the extent that the passenger 9 is not completely restrained in the seat 8 (a tension force is given to the webbing 3), whereas the normal winding position refers to a position in which the webbing 3 is wound up only with the biasing force of the winding spring.

Accordingly, as a result of restraining the upper body of the passenger 9 on the seat back 8*b* to a certain extent, the upper body and the head of the passenger 9 can be quickly supported on the seat back 8*b* and the head rest 8*c* at the time of a rear vehicular collision.

The upper body and the head of the passenger 9 that have been pressed against the seat back 8*b* and the head rest 8*c* at the time of a rear vehicular collision are pushed forward immediately after the rear vehicular collision as a result of a rebound action from the seat back 8*b* and the head rest 8*c*. Moreover, the upper body and the head of the passenger 9 are pushed forward also as a result of the seat back 8*b* and the head rest 8*c* that have inclined backward together with the upper body and the head of the passenger 9, returning to their initial state.

At this time, the tension force of the webbing 3 is appropriately suppressed, and the upper body and the head of the passenger 9 can move forward from the seat back 8*b* to a certain extent as a result. Therefore, the situation where only the head of the passenger 9 swings forward with respect to the upper body is prevented. As a result, the load on the neck of the passenger 9 can be reduced.

As a method of controlling winding of the webbing 3 so as to follow the backward movement of the passenger 9, for example, there may be considered a method in which the controller pre-stores a relationship between an occurring acceleration and an amount of the movement of the passenger 9 at the time of a rear vehicular collision, and, based on this relationship, the winding amount of the webbing 3 (rotation amount of the belt reel 11) is determined based on the acceleration that occurs in the actual event of a rear vehicular collision. Moreover, it may be considered that the winding amount of the webbing 3 is determined based on detection results from the above rotation angle sensor. Furthermore, combining these two types of controls may be considered.

Moreover, as a method of controlling rotation of the belt reel 11 to the predetermined winding position, for example, there may be considered a method in which the drive of the motor 13 is controlled based on the period of time for electric current conduction to the motor 13 and the value of electric current to be conducted to the motor 13. Moreover, it may be considered that the drive of the motor 13 is controlled based on detection results from the rotation angle sensor. Furthermore, combining these two types of controls may also be considered.

Figure 4A:
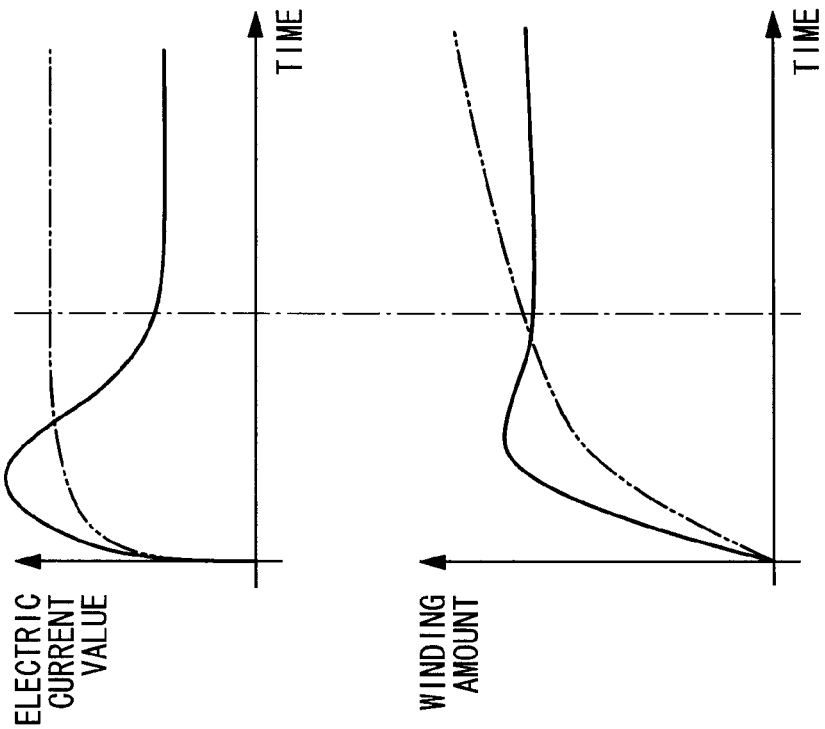
FIG. 4A is a graph showing time variation in the value of motor electric current and the amount of winding in the case where electric current conduction amount to a motor is controlled to achieve a substantially constant webbing winding amount at the time of a rear vehicular collision.

FIG. 4A shows an aspect of a motor control in which immediately after a rear vehicular collision, the electric current value of the motor 13 is raised so as to increase the rotation amount of the belt reel 11, that is, the winding amount of the webbing 3 to a target value, and after the winding amount has reached the target value (after the belt reel 11 has reached the predetermined winding position), the electric current value is lowered to a value necessary for maintaining this winding amount.

Figure 4B:
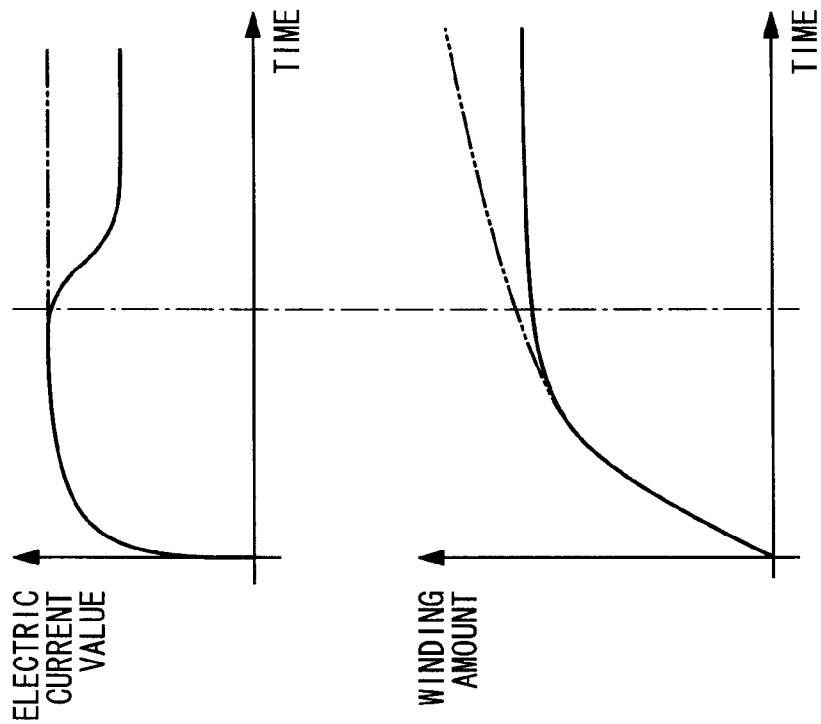
FIG. 4B is a graph showing time variation in the value of motor electric current and the amount of winding in the case where electric current conduction to the motor is controlled to give a predetermined variation to webbing winding amount.

On the other hand, FIG. 4B shows an aspect of a control in which immediately after a rear vehicular collision, the electric current value of the motor 13 is rapidly raised to a value higher than the target value, and the winding amount of the webbing 3 is rapidly increased to thereby effectively give a tension force to the shoulder belt 3*a* and the lap belt 3*b*, and then the electric current value of the motor 13 is gradually reduced until the winding amount of the webbing 3 has reached the target value, and then the electric current value is maintained at a value necessary to maintain the winding amount of the webbing 3 at the target value.

The curved lines shown with dashed lines in FIG. 4A and FIG. 4B show examples of where the electric current value of the motor 13 is kept constant so as to increase the winding amount of the webbing 3.

Next, the processing sequence of a motor control performed by the controller 15 is described, with reference to the flow charts shown in FIG. 5 to FIG. 8. This processing is repeatedly executed at predetermined time intervals.

Figure 5:
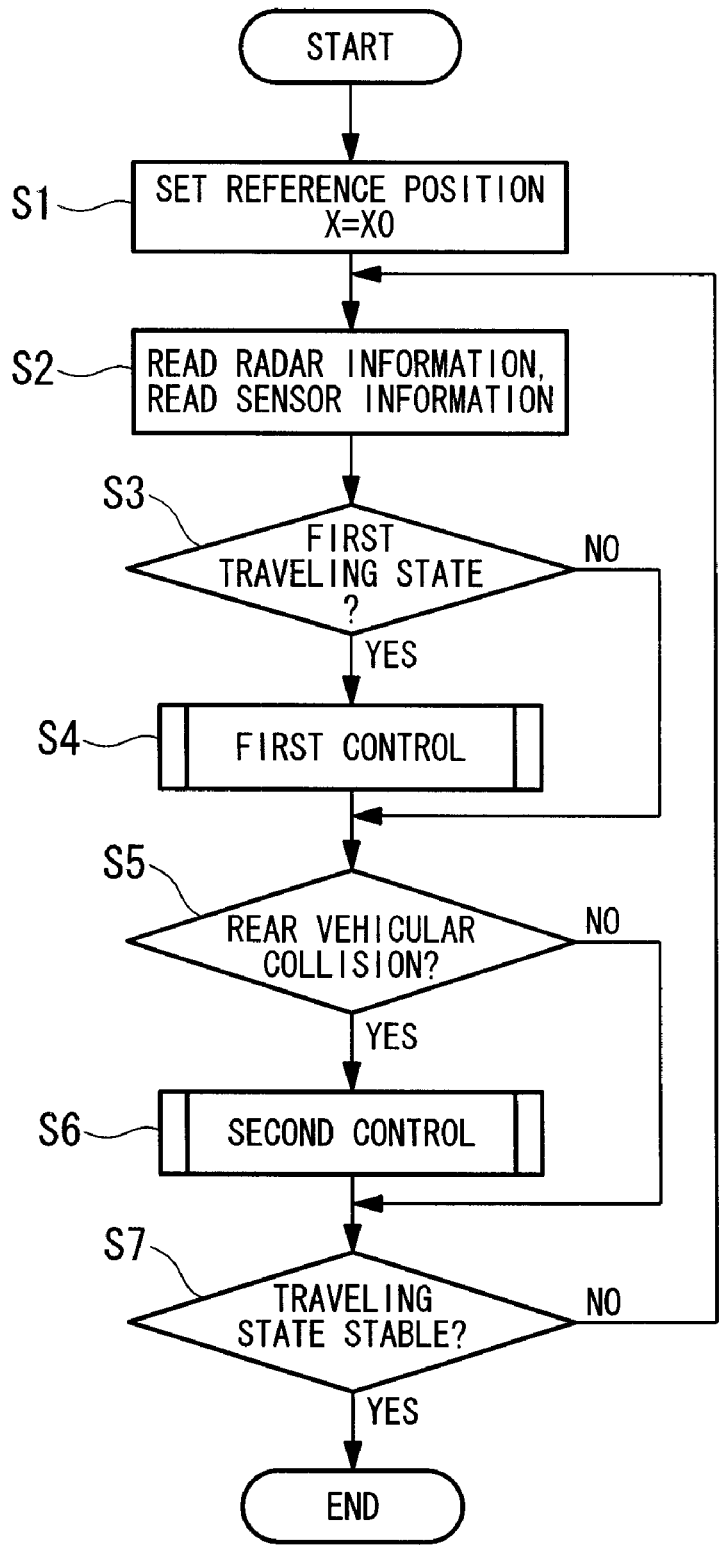
FIG. 5 is a flow chart showing a processing sequence of a motor control performed by a controller of the above seatbelt device.

First, as shown in FIG. 5, a winding reference position X0 of the belt reel 11 is set (step S1). This winding reference position X0 corresponds to the rotation position of the belt reel 11 at a time when the passenger 9 seated on the seat 8 has pulled out and normally attached the webbing 3. The state where the passenger 9 has normally attached the webbing 3 refers to a state where the winding amount of the webbing 3 continues to be equal to or exceed a predetermined amount for a predetermined period of time or longer.

Next, radar information and sensor information from the object detection device 17 and the vehicle state detection device 18 are read (step S2). Based on this information, the presence of objects approaching the vehicle, and the traveling state of the vehicle are detected, thereby determining whether or not the vehicle is in a first traveling state (step S3). The first traveling state corresponds to, for example, a case where an object is predicted to collide with the vehicle, or a case where a vehicle behavior such as rolling and pitching are out of acceptable range.

In the case where it is determined to be in the first traveling state in step S3 (YES), in a first control described later, the amount of electric current conduction to the motor 13 is controlled to perform a control to maintain the belt reel 11 at a predetermined winding position (step S4).

After the first control has been performed, or if it is determined not to be in the first traveling state in step S3 (NO), the flow proceeds to step S5 to determine whether or not a rear vehicular collision has occurred to the vehicle.

This determination is performed by determining, based on the radar information and sensor information from the object detection device 17 and the vehicle state detection device 18, whether or not the object that has approached the vehicle has collided with the vehicle and an impulsive acceleration has acted on the vehicle. In the case where the occurrence of a rear vehicular collision is determined in step S5 (YES), in a second control described later, the amount of electric current conduction to the motor 13 is controlled to perform a control to maintain the belt reel 11 at a predetermined winding position (step S6).

After the second control has been performed, or if it is determined in step S5 that a rear vehicular collision has not occurred (NO), the flow proceeds to step S7 to determine whether or not the traveling state of the vehicle has been stabilized.

This determination is performed by determining, based on the radar information and sensor information from the object detection device 17 and the vehicle state detection device 18, whether or not there is no object approaching the vehicle and a rapid acceleration variation to the vehicle is being suppressed. In the case where the traveling state of the vehicle is determined to have been stabilized in step S7, the processing is terminated, and in the case where the traveling state of the vehicle is determined to have not been stabilized, the flow returns to step S2 and the subsequent processing is repeated.

Figure 6:
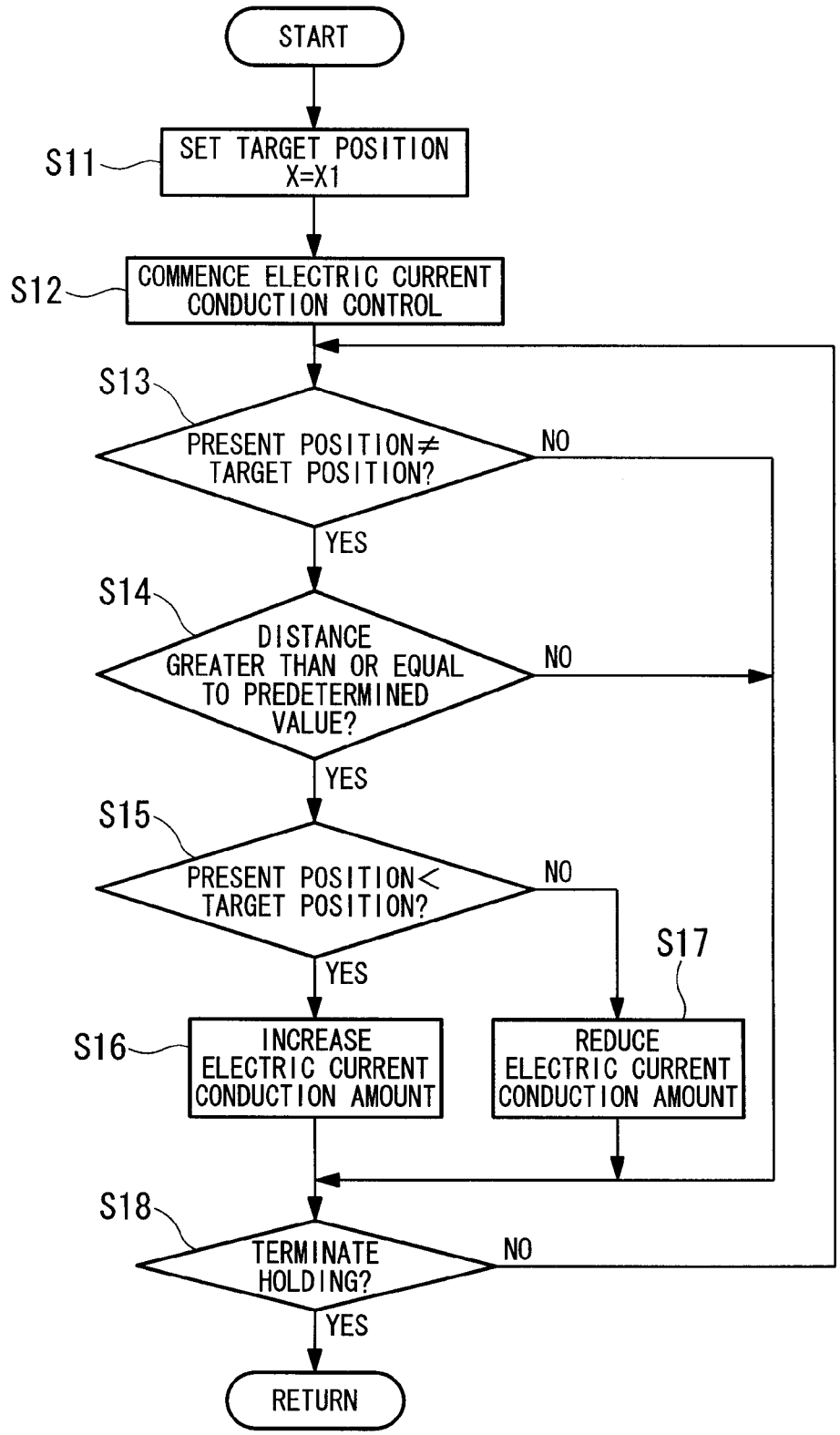
FIG. 6 is a sub flow chart showing a first control in the above processing sequence.

As shown in FIG. 6, in the first control, a first winding target position X1 of the belt reel 11 is set first (step S11). This winding target position X1 is set, for example, with consideration of preliminary winding of the webbing 3 in the case where an object is predicted to collide with the vehicle, and of supporting force reinforcement for the passenger 9 in the case where vehicle behavior is unusual.

Next, a control of electric current conduction to the motor 13 is commenced so that the belt reel 11 reaches the target position X1 (step S12), and in step S13, it is determined whether or not the present winding position of the belt reel 11 is equal to the winding target position X1.

If the result of this determination is YES (in the case where the present winding position of the belt reel 11 does not equal to the winding target position X1), the flow proceeds to step S14, and it is determined whether or not the distance between the present winding position of the belt reel 11 and the winding target position X1 is greater than or equal to a predetermined value.

If the result of this determination is YES (in the case where the distance between the present winding position of the belt reel 11 and the winding target position X1 is greater than or equal to the predetermined value), the flow proceeds to step S15 and it is determined whether or not the present winding position of the belt reel 11 is at a position where the winding amount of the webbing 3 is less than that at the winding target position X1.

If the result of this determination is YES (in the case where the present winding position of the belt reel 11 is at the position where the winding amount of the webbing 3 is less than that at the winding target position X1), the amount of electric current conduction to the motor 13 is increased so as to increase the winding amount of the webbing 3 (step S16). On the other hand, if the result of this determination is NO (the present winding position of the belt reel 11 is at the position where the winding amount of the webbing 3 is greater than that at the winding target position X1), the amount of electric current conduction to the motor 13 is reduced so as to reduce the winding amount of the webbing 3 (step S17).

Subsequently, the flow proceeds to step S18 to determine whether or not to terminate the control to maintain the belt reel 11 at the winding target position X1. This determination is performed, for example, based on whether or not the vehicle has been brought into a stable traveling state or whether or not the vehicle has been brought into the second traveling state (a state where a collision of an object with the vehicle is predicted at a higher level, or a state where the vehicle behavior such as rolling and pitching has become more significant).

If the result of this determination is YES (in the case where the control to maintain the belt reel 11 at the winding target position X1 is to be terminated), the first control is terminated. If the determination result is NO (in the case where the control to maintain the belt reel 11 at the winding target position X1 is to be continued), the flow returns to step S13 and the subsequent processing is repeated.

If the determination result in step S13 is NO (in the case where the present winding position of the belt reel 11 is equal to the winding target position X1), or if the determination result in step S14 is NO (in the case where the distance between the present winding position of the belt reel 11 and the winding target position X1 is less than the predetermined value), the flow proceeds to step S18 to determine whether or not to terminate the control to maintain the belt reel 11 at the winding target position X1 as described above.

Figure 7:
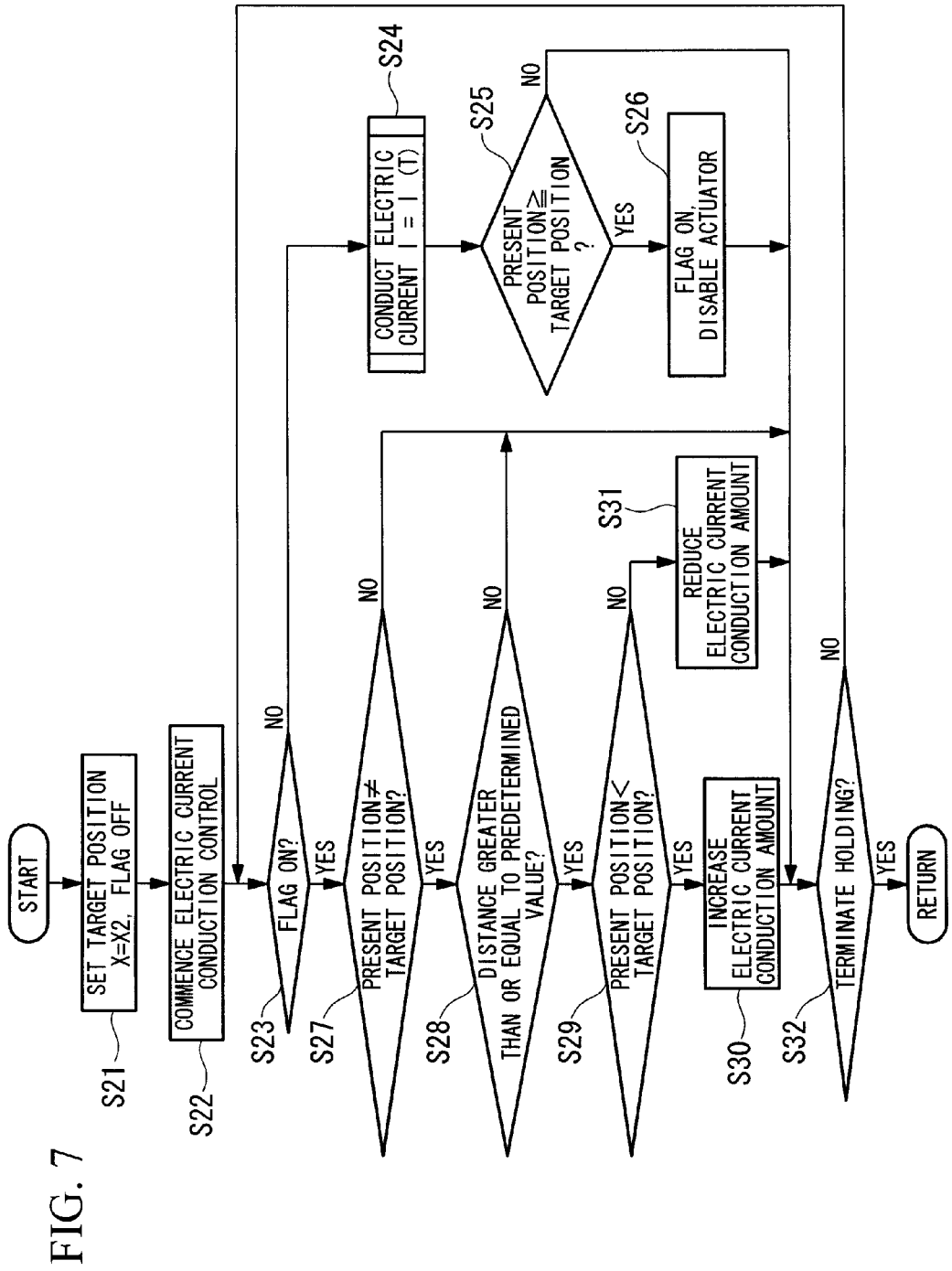
FIG. 7 is a sub flow chart showing a second control in the above processing sequence.

As shown in FIG. 7, in the second control, first, a second winding target position X2 of the belt reel 11 is set and a control to turn a flag OFF is performed (step S21). The winding target position X2 is set with consideration of an amount of forward movement of the passenger 9 and so forth due for example to the rebound action at the time of a rear vehicular collision.

Next, a control of electric current conduction to the motor 13 is commenced so that the belt reel 11 reaches the winding target position X2 (step S22), and then, in step S23, it is determined whether or not the flag is turned ON.

If the result of this determination is NO (if the flag is OFF), the flow proceeds to step S24, and a time-dependent control of electric current conduction to the motor 13 is performed so as to control the present winding position of the belt reel 11.

Figure 8A:
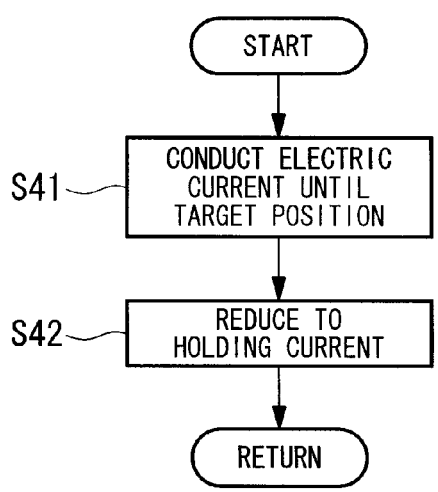
Figure 8B:
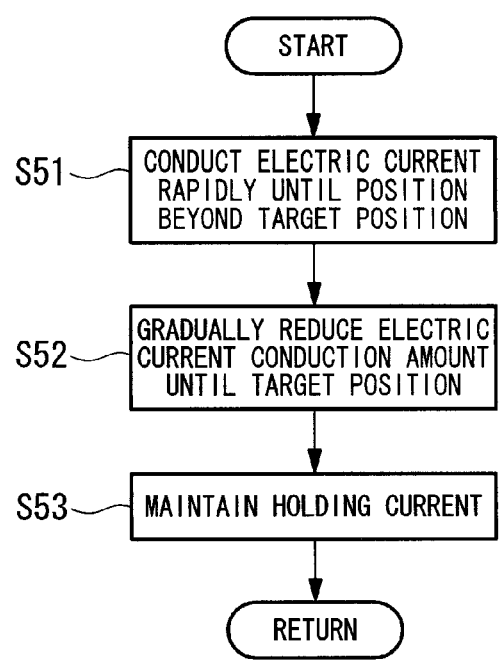

The electric current conduction control at this time is such that as shown in FIG. 8A, after performing electric current conduction until the belt reel 11 has reached the winding target position X2 (step S41), the amount of electric current conduction is reduced to a value required for maintaining the belt reel 11 at the winding target position X2 (step S42). Alternatively, as shown in FIG. 8B, after performing rapid electric current conduction until the belt reel 11 has reached a position beyond the winding target position X2 (step S51), the amount of electric current conduction is reduced until the position of the belt reel 11 has been positioned in the winding target position X2 (step S52), and then the amount of electric current conduction is maintained so as to maintain the belt reel 11 at the winding target position X2 (step S53). The control shown in FIG. 8A corresponds to the control shown in FIG. 4A, and the control shown in FIG. 8B corresponds to the control shown in FIG. 4B.

Subsequently, as shown in FIG. 7, in step S25, it is determined whether or not the present winding position of the belt reel 11 is at a position where the winding amount of the webbing 3 is greater than that at the winding target position X2. If the result of this determination is YES (in the case where the present winding position of the belt reel 11 is at the position where the winding amount of the webbing 3 is greater than that at the winding target position X2), a control to turn the flag ON and to disable the actuator 19 is performed, and then the flow proceeds to step S32. On the other hand, if the result of the determination in step S25 is NO (in the case where the present winding position of the belt reel 11 is at a position where the winding amount of the webbing 3 is less than that at the winding target position X2), the flow proceeds to step S32 while maintaining the flag OFF.

In step S32, it is determined whether or not to terminate the control to maintain the belt reel 11 at the winding target position X2. If the result of this determination is NO (in the case where the control to maintain the belt reel 11 at the winding target position X2 is to be continued), the flow returns to step S23 and the subsequent processing is repeated.

In step S23, if the result of the determination is NO (in the case where the flag is OFF), the flow proceeds to step 24 to perform the subsequent processing as described above. However, if the determination result is YES (in the case where the flag is ON), the flow proceeds to step S27. In step S27, it is determined whether or not the present winding position of the belt reel 11 is equal to the winding target position X2.

If the result of this determination is YES (in the case where the present winding position of the belt reel 11 is not equal to the winding target position X2), the flow proceeds to step S28 and it is determined whether or not the distance between the present winding position of the belt reel 11 and the winding target position X2 is greater than or equal to a predetermined value.

If the result of this determination is YES (in the case where the distance between the present winding position of the belt reel 11 and the winding target position X2 is greater than or equal to the predetermined value), the flow proceeds to step S29 and it is determined whether or not the present winding position of the belt reel 11 is at a position where the winding amount of the webbing 3 is less than that at the winding target position X2.

If the result of this determination is YES (in the case where the present winding position of the belt reel 11 is at a position where the winding amount of the webbing 3 is less than that at the winding target position X2), the amount of electric current conduction to the motor 13 is increased so as to increase the winding amount of the webbing 3 (step S30). On the other hand, if the result of this determination is NO (the present winding position of the belt reel 11 is at a position where the winding amount of the webbing 3 is greater than that at the winding target position X2), the amount of electric current conduction to the motor 13 is reduced so as to reduce the winding amount of the webbing 3 (step S31).

Subsequently, the flow proceeds to step S32 to determine whether or not to terminate the control to maintain the belt reel 11 at the winding target position X2. This determination is performed based on, for example, whether or not a rapid acceleration caused by a rear vehicular collision is no longer present.

If the result of this determination is YES (in the case where the control to maintain the belt reel 11 at the winding target position X2 is to be terminated), the second control is terminated. If the determination result is NO (in the case where the control to maintain the belt reel 11 at the winding target position X2 is to be continued), the flow returns to step S23 and the subsequent processing is repeated.

If the result of the determination in step S27 is NO (in the case where the present winding position of the belt reel 11 is equal to the winding target position X2), or if the result of the determination in step S28 is NO (in the case where the distance between the present winding position of the belt reel 11 and the winding target position X2 is less than the predetermined value), the flow proceeds to step S32. In step S32, it is determined whether or not to terminate the control to maintain the belt reel 11 at the winding target position X2 as described above.

As described above, the seatbelt device 1 of the vehicle in the above embodiment is provided with; the belt reel 11 having the webbing 3 wound thereon, the rotation sensor 14 that detects the winding position of the belt reel 11, the motor 13 that performs winding of the webbing 3 by driving the belt reel 11 to rotate, and the controller 15 that performs the control of electric current conduction to the motor 13. The controller 15 performs electric current conduction to the motor 13 with a predetermined amount of electric current at the time of a rear vehicular collision or when a rear vehicular collision is predicted, and when the winding position detected by the rotation sensor 14 reaches the predetermined position during the electric current conduction, it controls the amount of electric current conduction so as to suppress variation in the winding position.

According to this configuration, at the time of a rear vehicular collision or when a rear vehicular collision is predicted, based on the detection information from the rotation sensor 14, the amount of electric current conduction to the motor 13 in the case where the winding position of the belt reel 11 (the winding amount of the webbing 3) reaches the predetermined position (for example, the position at which the passenger 9 is not fully restrained) is limited. That is to say, by only suppressing variation in the winding position, the webbing 3 is appropriately wound up to thereby appropriately restrain the upper body of the passenger 9 on the seat back 8b when a rear vehicular collision is predicted, while allowing the upper body of the passenger 9 to move forward from the seat back 8b to a certain extent at the time of an actual rear vehicular collision. As a result, it is possible to suppress forward swinging of the head of the passenger due to the rebound action after the rear vehicular collision.

That is to say, by performing a simple control in which the belt reel 11 is driven to rotate to the predetermined position at the time of a rear vehicular collision or when a rear vehicular collision is predicted, excessive restraint of the webbing 3 can be suppressed.

Moreover, in the seatbelt device 1, by setting the predetermined amount of electric current conduction so as to be raised to maximum immediately after the commencement of the electric current conduction, and to then be gradually reduced, the webbing 3 is quickly wound up immediately after the rear vehicular collision and an appropriate tension force is given to the shoulder belt 3a and the lap belt 3b. As a result, the hip of the passenger 9 can be appropriately restrained. Moreover, as a result of the subsequent gradual reduction in the amount of electric current conduction, mainly the tension force of the shoulder belt 3a is loosened and the upper body of the passenger 9 can move forward as a result.

Furthermore, the above seatbelt device 1 is provided with the actuator 19 that drives the belt reel 11 to rotate with the thrust force of an explosive, and the controller 15 that disables the actuator 19 when the winding position reaches the predetermined value, thereby preventing the belt reel 11 maintained at the predetermined winding position, from being further rotation beyond the predetermined winding position by the actuator 19 operated by the thrust force of the explosive.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A seatbelt device for a vehicle comprising:
a belt reel having webbing wound thereon;

a position detection device that detects a winding position of the belt reel;

a motor that drives the belt reel to rotate to thereby perform winding of the webbing; and a control section that performs control of electric current conduction to the motor, wherein:

the control section performs electric current conduction to the motor at a predetermined amount at the time of a rear vehicular collision or when a rear vehicular collision is predicted; and the electric current conduction amount is controlled, so that during electric current conduction at the predetermined electric current conduction amount, when a winding position detected by the position detection device reaches a predetermined position, variation in the winding position is suppressed.

2. A seatbelt device for a vehicle according to claim 1, wherein the predetermined electric current conduction amount is substantially constant.

3. A seatbelt device of a vehicle according to claim 2, further comprising an actuator that drives the belt reel to rotate with a thrust force of an explosive, wherein the control section disables the actuator when the winding position reaches a predetermined value.

4. A seatbelt device for a vehicle according to claim 1, wherein the predetermined electric current conduction amount is controlled so as to become a maximum value immediately after commencing electric current conduction, and subsequently be gradually reduced.

5. A seatbelt device of a vehicle according to claim 4, further comprising an actuator that drives the belt reel to rotate with a thrust force of an explosive, wherein the control section disables the actuator when the winding position reaches a predetermined value.

6. A seatbelt device of a vehicle according to claim 1, further comprising an actuator that drives the belt reel to rotate with a thrust force of an explosive, wherein the control section disables the actuator when the winding position reaches a predetermined value.

7. A control method of a seatbelt device for a vehicle having: a belt reel having webbing wound thereon; a position detection device that detects a winding position of the belt reel; and a motor that drives the belt reel to rotate to thereby perform winding of the webbing, the control method comprising:

a step of performing electric current conduction to the motor at a predetermined electric current conduction amount during a predetermined period of time from a moment at which a rear vehicular collision occurs or a rear vehicular collision is predicted;

a step of determining, during the predetermined period of time, whether or not the belt reel has reached a predetermined winding position, based on detection results from the position detection device;

a step of monitoring positional variation in the belt reel after the belt reel has reached a predetermined winding position; and a step of changing the amount of electric current conduction to the motor based on the positional variation.

8. A control method of a seatbelt device for a vehicle according to claim 7, wherein the step of performing electric current conduction at a predetermined electric current conduction amount during the predetermined period of time comprises:

a step of rapidly increasing the electric current conduction amount; and a step of gradually reducing the electric current conduction amount.

* * * * *